Oct. 8, 1940.  W. V. MIDDLETON  2,216,853
BALL TEEING DEVICE
Filed Jan. 29, 1938  4 Sheets-Sheet 1

Inventor:—
William V. Middleton
by his Attorneys
Howson & Howson

Oct. 8, 1940.    W. V. MIDDLETON    2,216,853
BALL TEEING DEVICE
Filed Jan. 29, 1938    4 Sheets-Sheet 2
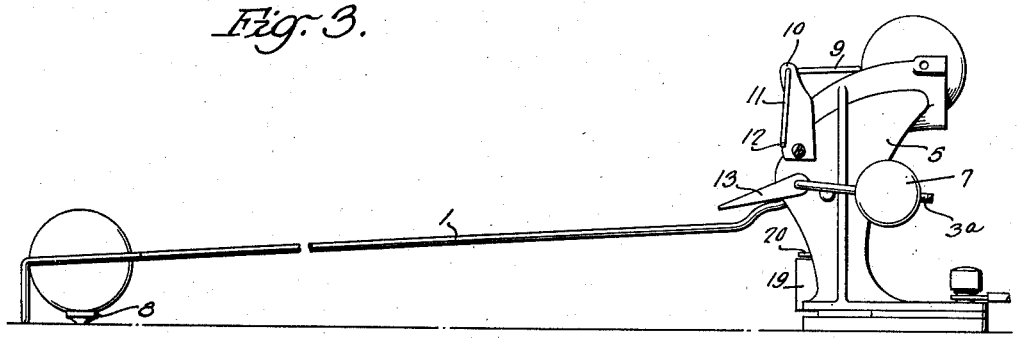
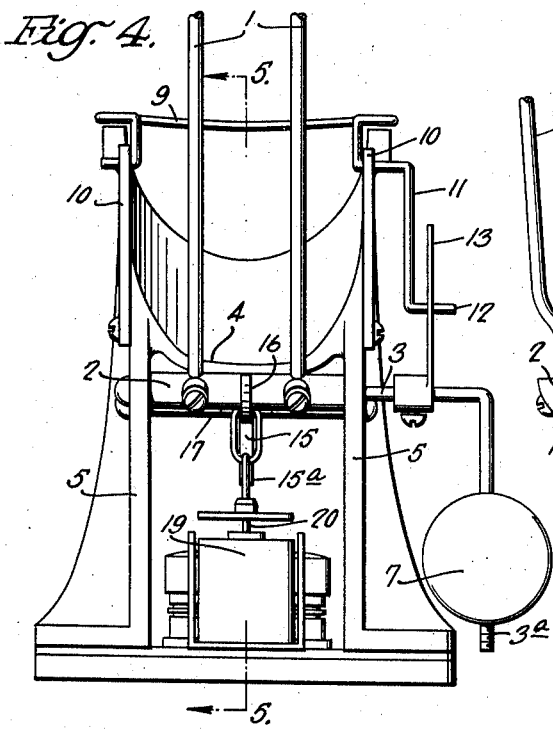
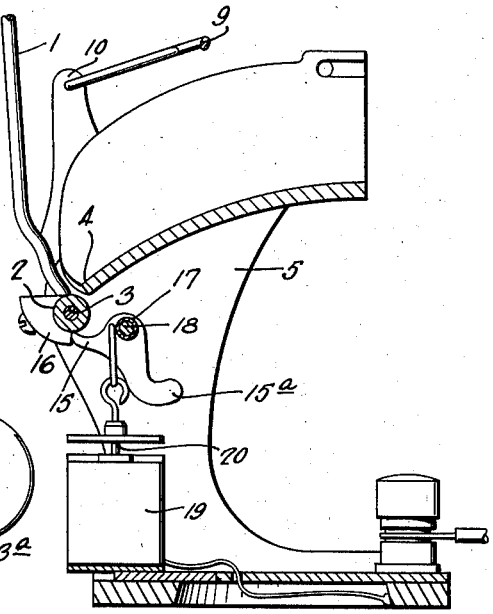
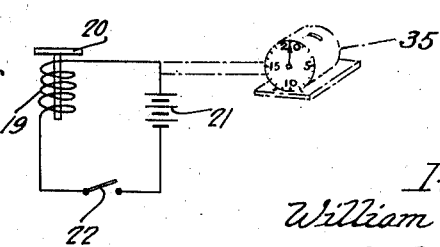
Inventor:—
William V. Middleton
by his Attorneys
Howson & Howson Oct. 8, 1940.  W. V. MIDDLETON  2,216,853
BALL TEEING DEVICE
Filed Jan. 29, 1938   4 Sheets-Sheet 3

Inventor:—
William V. Middleton
by his Attorneys
Howson & Howson

Oct. 8, 1940.　　W. V. MIDDLETON　　2,216,853
BALL TEEING DEVICE
Filed Jan. 29, 1938　　4 Sheets-Sheet 4

Inventor:-
William V. Middleton
By his Attorneys
Howson & Howson

Patented Oct. 8, 1940

2,216,853

UNITED STATES PATENT OFFICE 2,216,853

BALL TEEING DEVICE

William V. Middleton, Trenton, N. J.

Application January 29, 1938, Serial No. 187,764

5 Claims. (Cl. 273—33)

This invention relates to new and useful improvements in ball teeing devices and the principal object of said invention is to provide a device of the character set forth wherein successive positioning of a ball or balls upon the tee is effected by the weight of each ball when presented for delivery to said tee.

Another object of the invention is to provide a device of the stated character which is constructed and arranged to prevent the delivery of more than one ball at a time to a tee.

A further object of the invention is to provide a device of the stated type together with novel means for controlling the delivery of successive balls to the tee, such means being itself controlled by displacement of the ball from the tee, or by the person operating the device, as desired.

These and other objects of the invention and the features and details of the construction and operation thereof are set forth hereinafter and shown in the accompanying drawings in which:

Figure 3 is a view in side elevation showing the ball teeing device and control mechanism in operative or ball teeing position;

Figure 4 is a fragmentary view in end elevation showing such device in inoperative position;

Figure 5 is a view in section taken on line 5—5, Figure 4;

Figure 6 is a diagrammatic layout of an electric circuit for controlling operation of the device;

Figure 1:
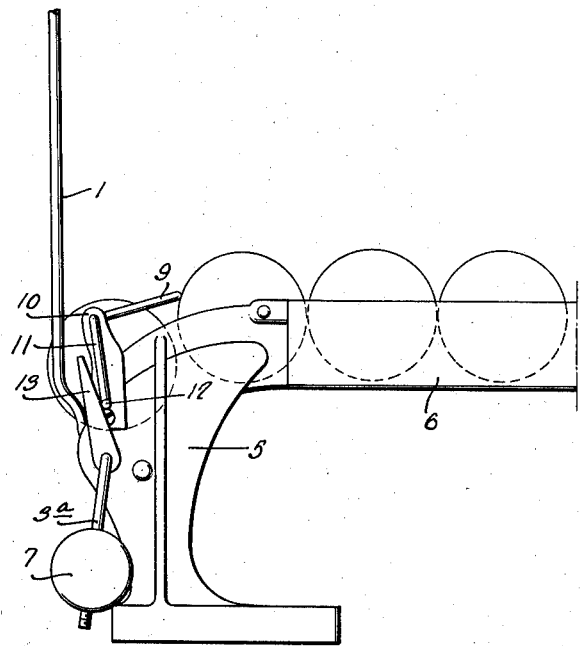
Figure 1 is a view in side elevation showing the ball teeing device in inoperative or ball receiving position.

Referring now more particularly to the drawings, a ball teeing device made in accordance with the present invention contemplates a ball conducting arm or track 1 secured at its inner end to a sleeve 2 which is in turn secured upon a shaft 3 rotatably mounted adjacent and below the discharge end of a slightly declining channel, trough or reservoir 4 in a pair of spaced side frame or bracket members 5, the other end of the trough or reservoir 4 being connected to a track or runway 6 for returning the balls from a target (not shown) to said teeing device.

Figure 2:
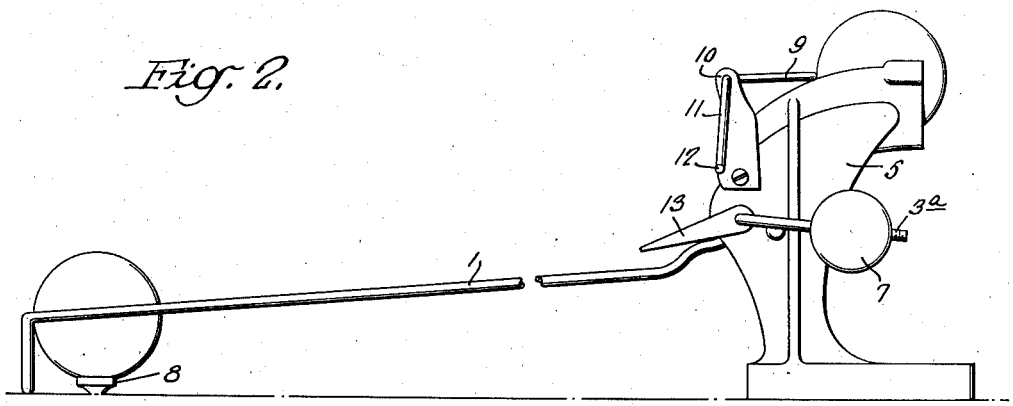
Figure 2 is a view similar to Figure 1 showing said device in operative or ball teeing position.

In the present form of teeing device the shaft 3 projects a substantial distance beyond one side frame 5 and terminates in a perpendicularly disposed portion 3a on which is adjustably mounted a weight or counter balance 7. The moment or force exerted by the weight of the counterbalance 7 upon the shaft 3 should be slightly less than the moment or force exerted about said shaft 3 by the combined weight of a ball, the track 1 and its mounting, so that engagement of said track by such ball will cause the track 1 to be actuated in a counter-clockwise direction with respect to the drawings into the position shown in Figure 2 thereof to conduct said ball from the reservoir 4 and deposit the same in driving position upon a tee 8. On the other hand the turning moment exerted by the weight of the counterbalance 7 must necessarily be sufficiently in excess of that exerted by the weight of the track 1 and its mounting so as to cause the same to be returned to the inoperative position shown in Figure 1 after the ball has been deposited upon said tee 8.

For the purpose of preventing more than one ball at a time from being conducted to the tee 8 by means of the track 1, a bridge piece 9 is pivotally mounted in relatively spaced brackets 10 which are secured to opposite sides of the frame members 5 and this bridge piece 9 tends to normally assume a position transversely overlying the edges of the trough or reservoir 4 ahead of the next succeeding ball therein as clearly illustrated in the drawings.

As shown in Figure 4, this bridge piece 9 includes a depending portion 11 located outwardly beyond the same side frame member 5 as the angular portion 3a of shaft 3 and this depending portion 11 terminates at its extremity in a horizontally projecting portion 12 which resides in the path of an arm 13 adjustably secured upon the projecting portion of the shaft 3 for rotation therewith. The arm 13 is secured circumferentially upon the shaft 3 in such relation that as the counterbalance 7 returns the track 1 to inoperative or ball receiving position, said arm 13 will engage the portion 12 of the bridge piece 9 and actuate the same in a counter-clockwise direction a distance sufficient to permit the next ball in the trough 4 to pass thereunder and into actuating engagement with the track 1 after which time said bridge piece 9 will return by its own weight to its normal position overlying the trough for preventing passage of the next succeeding ball therein to said track.

From the foregoing, it will be observed that the teeing device is entirely automatic and self-operating and may be used effectively with but a single golf ball or several or even a large number thereof, the operation of the device in each instance being the same in that when the ball to be teed engages the track 1 the turning moment created by the combined weight of the latter and said ball actuates said track into operative or teeing position. The bridge piece 9 prevents other balls, if any, from discharging from the trough or reservoir 4 and when the ball is deposited on the tee 8, the weight 7 functions to return the track 1 to substantially vertical position to receive the next ball which is allowed to pass down the reservoir 4, the obstruction provided by said bridge piece 9 having been momentarily lifted by the arm 13, into engagement with said track 1 by means of which said ball is, in a similar manner, deposited on the tee 8 and this operation will be repeated automatically so long as a ball is returned to or deposited in said trough or reservoir 4. Accordingly, it will be observed that so long as balls are supplied to the trough or reservoir 4, a device constructed as above described will automatically operate to periodically deposit a ball upon the tee 8.

The intervals between periodic deposits of successive balls upon the tee 8 are of equal and relatively short duration, thus making it necessary for the person using the device to drive each ball from said tee 8 during such interval and before the succeeding ball is deposited upon the tee. This very often does not afford the player sufficient opportunity to assume his or the proper stance to the end that the ball may be driven through the best trajectory, and consequently, some means by which the player may control operation of the teeing device, is, in many instances, desirable. To this end, I provide a co-operating catch member 15 and lug 16 constructed and arranged to interengage each other as the track 1 is returned to inoperative position by the counter balance 7 whereby said track is retained in that position until the catch 15 is released or disengaged from the lug 16 by suitable mechanism under the direct or indirect control of the operator or player.

As shown particularly in Figure 5 of the drawings, the lug 16 is of segmental form or shape and is secured to or formed upon the sleeve 2 to which the track 1 is secured. The catch member 15, on the other hand, is mounted upon a sleeve 17 which is rotatably mounted upon a shaft 18 supported horizontally between the side frame members 5 and includes a counter weight portion 15a which tends to pivot said catch member 15 in a clockwise direction into engagement with the rear edge of the segmental lug 16 as illustrated and prevent further teeing operations of the track 1.

Release or disengagement of the catch member 15 from the segmental lug 16 is preferably effected by means of a solenoid 19, the usual axially movable plunger or core 20, which has its upper end detachably connected to said catch member 15 at the opposite side of the shaft 18 from the counter-weight portion 15a which is of sufficient weight to normally hold the plunger 20 in raised position so long as the solenoid 19 is de-energized. The solenoid 19 is connected in the usual manner to a source of electrical energy 21 and energization of said solenoid thereby is controlled by means of a manually operated switch 22 as shown in Figure 6 of the drawings, said switch 22 being located in proximity to the tee 8 so as to be accessible to the player. In accordance with this arrangement, the switch 22 is momentarily closed to energize the solenoid 19 with the result that the plunger 20 is drawn downwardly therein thus disengaging the catch member 15 from the lug 16 and permitting the track 1 to be actuated by a ball into teeing position. When the ball has been deposited upon the tee 8 the counterbalance 7 then causes the track 1 to return to its inoperative position during which movement the arm 13 raises the bridge piece 9 to permit the succeeding ball to advance to a position adjacent said track, and as the track 1 reaches said inoperative or raised position the lug 16 associated therewith is engaged by the catch member 16 with the result that the track is rendered inoperative until such time as the solenoid 19 is again energized by momentarily closing the switch 22.

Figure 7:
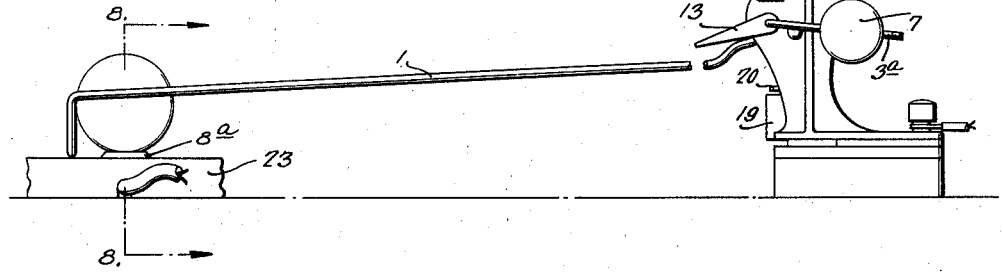
Figure 7 is a view in side elevation of the device in operative or ball-teeing position showing another form of operating control mechanism therefor.
Figure 8:
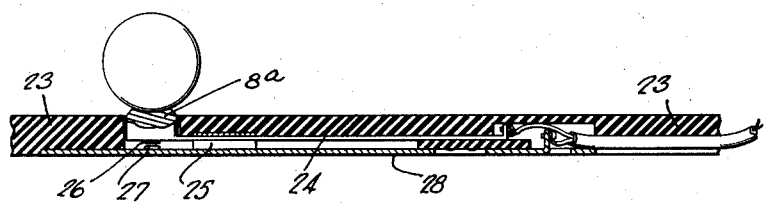
Figure 8 is an enlarged fragmentary view in section taken on line 8—8, Figure 6.
Figure 9:
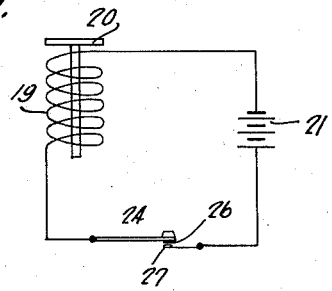
Figure 9 is a diagrammatic layout of an electrical circuit for said control mechanism.

In lieu of a manually operated switch 22, it may be desirable to provide a switch mechanism which may be operated automatically or by the "play" itself so that the attention of the player or user of the device, which may be directed to the game, need not be diverted, and, referring to Figures 7 and 8 of the drawings, such a switch mechanism may be associated with a tee 8a upon which the balls are deposited in driving position, in which event said tee 8a is mounted in an opening or recess in a base structure 23 by means of a spring strip or the like 24 in such manner as will permit of slight vertical movement of the tee 8a within said opening or recess relative to said base structure 23. The spring strip 24 is anchored to the base structure 23 and tends to urge the tee 8a upwardly and outwardly of the opening or recess, such action being positively limited by means of a stop afforded by the strap member 25. An electrical contact 26 is secured to the under side of the spring strip 24 below the tee 8a and arranged to engage a second contact element 27 upon the upper face of a base plate 28, and these contacts 26 and 27 are respectively connected into the energizing circuit of the solenoid either directly or, as shown in Figures 8 and 7, indirectly through said spring strip 24 and base plate 28.

In operation of this switch mechanism, the spring strip 24 maintains the contacts 26 and 27 normally open and with a ball positioned upon the tee 8a when said ball is driven from said tee by a golf club or otherwise, the tee 8a is deflected or actuated downwardly against said spring strip 24 to momentarily close said contacts 26 and 27 and energize the solenoid 19 which releases the catch member 15 permitting the teeing device to position another ball upon said tee 8a in the manner previously described, further operation of the teeing device upon being returned to inoperative position by the counterbalance 7 being prevented by the catch member 15 until such time that the ball just deposited is driven from the tee 8a resulting in downward actuation of the latter to again close the contacts 26 and 27.

Figure 10:
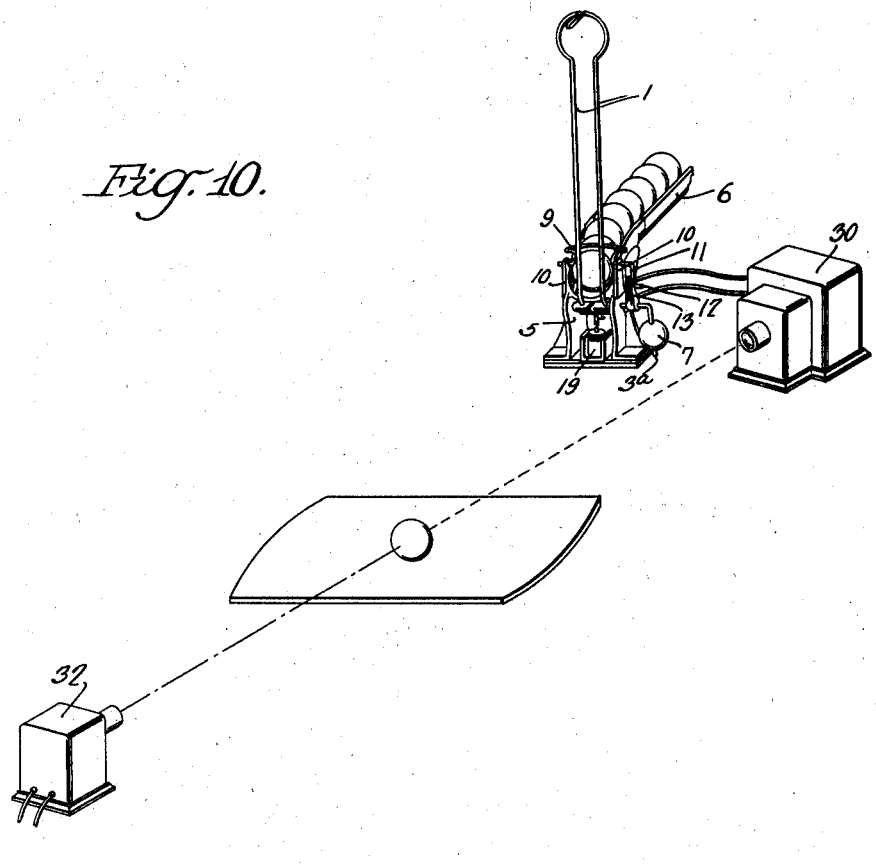
Figure 10 is a view in perspective of the invention showing still another form of operating control mechanism.
Figure 11:
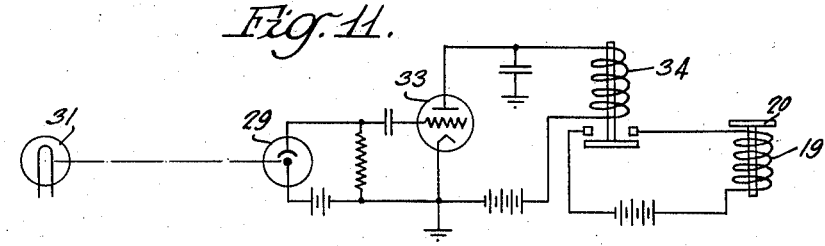
Figure 11 is a diagrammatic layout of an electrical circuit for the control mechanism shown in Figure 10.

On the other hand, energization of the solenoid 19 may be controlled by means of a photo-electric cell activated in the usual manner by a light beam as illustrated in Figures 10 and 11 of the drawings. In this arrangement, the solenoid energizing apparatus including the photo-electric cell 29 is suitably enclosed within a housing 30 disposed at one side of the ball tee adjacent the teeing device and the light source 31 for activating the said photo-electric cell 30 is enclosed within a housing 32 disposed at the opposite side of said ball tee, the arrangement being such that the light beam from the source 31 lies or extends in a path over the ball tee so that it is or will be interrupted by a ball position on said tee.

The circuit energized by activation of the photo-electric cell is conventional in that it includes the usual amplifier 33, a relay 34, the necessary sources of electrical energy, and, of course, the solenoid 19, which is energized when the cell activating light beam impinges upon the photo-electric cell 29, thus when a ball is in position upon the tee, the teeing device will not operate to again deposit a ball until the preceding ball has been removed from the tee in some manner such as by being hit or driven with a golf club or the like so that the light beam from source 31 may again impinge upon the said photo-electric cell 29, the actual teeing operation of the device upon energization of the solenoid 19 being the same as that previously described.

As indicated in Figure 6 of the drawings hereof, a coin-operated time-controlled switch mechanism 35 may be employed in lieu of or in addition to the various forms of control switches and mechanisms previously described for the purpose of controlling operation of the teeing device. The coin-operated time-controlled switch mechanism 35 is preferably set or adjusted to permit operation of the teeing device for a predetermined period of time, for example, fifteen or twenty minutes after a coin is inserted or deposited therein to initially close the circuit, and such mechanism will afford suitable means for controlling operation of the teeing device where they are to be used by the general public, for example, at so-called golf-driving ranges, sporting goods stores, and similar places.

While several specific embodiments of the invention have been herein illustrated and described, it is not intended that the invention be precisely limited thereto, but that changes and modifications in the construction and arrangement thereof may be embodied and incorporated therein within the scope of the annexed claims.

I claim:

1. In a ball teeing device, an elevated ball reservoir, a stationary tee disposed independently of said reservoir in laterally spaced relation with respect thereto and arranged to support balls in driving position thereon, ball conducting means pivotally mounted adjacent the discharge end of the reservoir to receive and carry balls therefrom to said tee, said ball conducting means being so mounted and balanced as to be movable by the weight of a ball rolling thereon for depositing the ball upon the tee by gravity alone, and means including a weighted catch member arranged to engage the ball conducting means and retain the same in ball receiving position after each ball teeing operation thereof.

2. In a ball teeing device, an elevated ball reservoir, a stationary tee disposed independently of said reservoir in laterally spaced relation with respect thereto and arranged to support balls in driving position thereon, ball conducting means pivotally mounted adjacent the discharge end of the reservoir to receive and carry balls therefrom to said tee, said ball conducting means being so mounted and balanced as to be movable by the weight of a ball rolling thereon for depositing the ball upon the tee by gravity alone, means normally operative to prevent more than one ball at a time from being conducted from said reservoir actuable by the ball conducting means between successive ball teeing operations thereof to release a ball from the reservoir, and means including a weighted catch member arranged to engage the ball conducting means and retain the same in ball receiving position after each ball teeing operation thereof.

3. In a ball teeing device, an elevated ball reservoir, a stationary tee disposed independently of said reservoir in laterally spaced relation with respect thereto and arranged to support balls in driving position thereon, ball conducting means pivotally mounted adjacent the discharge end of the reservoir to receive and carry balls therefrom to said tee, said ball conducting means being so mounted and balanced as to be movable by the weight of a ball rolling thereon for depositing the ball upon the tee by gravity alone, and means including a weighted catch member arranged to engage the ball conducting means and retain the same in ball receiving position after each ball teeing operation thereof, and means operable at will to release said catch member to permit actuation of said ball conducting means into ball teeing position.

4. In a ball teeing device, an elevated ball reservoir, a stationary tee spaced laterally from and below said reservoir and arranged to support balls in driving position thereon, ball conducting means pivotally mounted adjacent the discharge end of the reservoir to receive and carry balls therefrom to said tee, said ball conducting means being so mounted and balanced as to be movable by the weight of a ball rolling thereon for depositing the ball upon the tee by gravity alone, a member carried by the ball conducting means, a weighted catch member arranged to engage said member and retain the ball conducting means in ball receiving position after each ball teeing operation thereof, a solenoid having its plunger connected to said weighted catch member, and means for energizing said solenoid to actuate the plunger and release the weighted catch member to permit actuation of said ball conducting means into ball teeing position.

5. In a ball teeing device, an elevated ball reservoir, a stationary tee spaced laterally from and below said reservoir and arranged to support balls in driving position thereof, ball conducting means pivotally mounted adjacent the discharge end of the reservoir to receive and carry balls therefrom to said tee, said ball conducting means being so mounted and balanced as to be movable by the weight of a ball rolling thereon for depositing the ball upon the tee by gravity alone, means normally operative to prevent more than one ball at a time from being conducted from said reservoir, means associated and movable with the ball conducting means arranged to actuate the means last mentioned between successive ball teeing operations thereof to release a ball from the reservoir, a member carried by said ball conducting means, a weighted catch member arranged to engage said member and retain the ball conducting means in ball receiving position after each ball teeing operation thereof, a solenoid having its plunger connected to said weighted catch member, and means for energizing said solenoid to actuate the plunger and release the weighted catch member to permit actuation of said ball conducting means into ball teeing position.

WILLIAM V. MIDDLETON.